Patented Apr. 10, 1945

2,373,174

UNITED STATES PATENT OFFICE 2,373,174

PROCESS FOR BREAKING PETROLEUM EMULSIONS

Melvin De Groote, University City, and Bernhard Keiser, Webster Groves, Mo., assignors to Petrolite Corporation, Ltd., Wilmington, Del., a corporation of Delaware No Drawing. Application March 9, 1943, Serial No. 478,594

5 Claims. (Cl. 252—341)

This invention relates primarily to the resolution of petroleum emulsions.

One object of our invention is to provide a novel process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

Another object of our invention is to provide an economical and rapid process for separating emulsions which have been prepared under controlled conditions from mineral oil, such as crude petroleum and relatively soft waters or weak brines. Controlled emulsification and subsequent demulsification under conditions just mentioned, is of significant value in removing impurities, particularly inorganic salts, from pipeline oil.

The demulsifier or demulsifying agent employed in our process consists of acylated derivatives obtained by reaction between a low molal dialkyl carbonate, particularly diethyl carbonate, and alkanolamines, including the ether type, i. e., such alkanolamines in which a carbon atom chain is interrupted at least once by an oxygen atom. Such alkanolamines may have an alicyclic radical, such as a cyclohexyl radical, an aralkyl radical, or an aryl radical attached to an amino nitrogen atom. In other words, one is not limited to the use of materials such as monoethanolamine, diethanolamine, triethanolamine, monopropanolamine, dipropanolamine, tripropanolamine, monobutanolamine, dibutanolamine, tributanolamine, or ether type derivatives obtained by treating the preceding with ethylene oxide, propylene oxide, glycid, or the like.

If desired, one may treat an alkylamine, such as amylamine, octylamine, decylamine, or the like, with one or more moles of ethylene oxide, propylene oxide, or the like, so as to obtain a suitable reactant. The same is true in regard to alicyclic amines, such as cyclohexylamine, or in regard to aralkylamines. It is also true in regard to various arylamines, such as aniline, and the like. It is to be noted that the alkanolamine need not be a tertiary amine, but may be a primary or a secondary amine. Thus, the expression "alkanolamine" is employed in the present instance to indicate that there must be present at least one nitrogen-linked alkanol group, including the type, as previously stated, in which the carbon atom chain is interrupted at least once by an oxygen atom. One may, of course, use polyamino compounds, such as, for example, the products obtained by treating ethylene diamine with ethylene oxide so as to introduce at least 4 hydroxyethyl radicals. The acyl radical may be introduced at any convenient stage, for instance, before the amino containing reactant has been combined with the low molal dialkyl carbonate, or afterwards. Other low molal carbonates which may be employed include dimethyl ester, methyl ethyl ester, methyl propyl ester, dipropyl ester, dibutyl ester, etc.

The acyl group which is introduced is derived from detergent-forming monocarboxy acids containing eight carbon atoms or more, and not more than 32 carbon atoms, and are characterized by the fact that they combine with alkalis to produce soap or soap-like materials. These detergent-forming acids include fatty acids, resin acids, petroleum acids, etc. For the sake of convenience, these acids will be indicated by the formula R.COOH. Certain derivatives of detergent-forming acids react with alkali to produce soap or soap-like materials, and are the obvious equivalent of the unchanged or unmodified detergent-forming acids; for instance, instead of fatty acids, one might employ the chlorinated fatty acids. Instead of the resin acids, one might employ the hydrogenated resin acids. Instead of naphthenic acids, one might employ brominated naphthenic acids, etc. Acids obtained by the oxidation of petroleum fractions or waxes may be employed. This type of acid may also be subjected to various modifications, provided such modifications still retain detergent-forming properties.

In some instances, more than one type of reaction may take place. For example, there may be a formation of a urethane and an amino ester simultaneously.

In view of what is said hereinafter, it is apparent that the compounds contemplated herein may be considered as acylation derivatives of esters of carbamic and carbonic acids, and more particularly, esters containing at least one nitrogen-linked alkanol radical, and in which the acyl radical is that of a detergent-forming monocarboxy acid having at least 8 and not more than 32 carbon atoms.

For the sake of clarity, the following reaction types are presented as illustrating the class of compounds formed. In all instances, they represent intermediate products and are acylated subsequently:

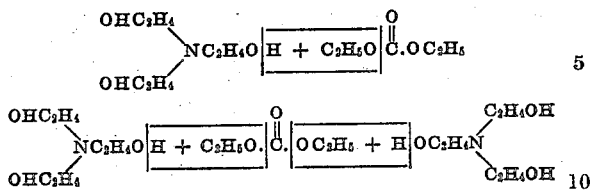

In reactions involving alkanol primary or secondary amines, a more complicated series of reactions may take place. Indeed, in the ordinary course the result of reaction is a mixture of various products. It is particularly true when the final acylated product is used as an intermediate for subsequent reaction with a material such as diethyl phthalate, that it is immaterial for many purposes, whether a single resultant is obtained or a mixture of resultants. Such phthalated derivatives are not contemplated per se in this present application, either as new compositions of matter, new chemical compounds, or as demulsifiers for water-in-oil emulsions.

The foregoing is illustrated by considering a very simple aspect, for instance, a reaction involving diethanolamine and diethyl carbonate. At least three possible reactions suggest themselves immediately:

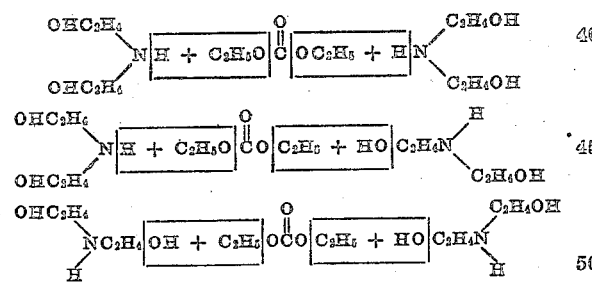

The same reaction as above illustrated will take place in connection with other materials, such as dipropanolamine, dibutanolamine, and also in connection with secondary amines of the type ethyl ethanolamine, ethyl propanolamine, ethyl butanolamine, propyl ethanolamine, propyl propanolamine, cyclohexyl ethanolamine, benzyl ethanolamine, phenyl ethanolamine, etc. This is also true in regard to primary amines, such as monoethanolamine, monopropanolamine, monobutanolamine, monopentanolamine, monohexanolamine, etc.

Reconsidering the three reactions immediately preceding, it is obvious that they may be considered as substituted ureas, substituted urethanes, and carbonic acid esters. The urethanes are, of course, esters of carbamic acid. It is also obvious that the products of reaction above described, the esters, urethanes, the substituted ureas, etc., can be treated with ethylene oxide, or some other reagent having a reactive ethylene oxide ring, and subsequently, acylated with a high molal monocarboxy acid. In this connection, reference is made to U. S. Patent No. 2,083,-221, dated June 8, 1937, to De Groote. Since the products therein contemplated are acylated derivatives of substituted ureas, it is obvious that such type of material is not contemplated in the present instance, although we have discovered that such material of a type contemplated in said aforementioned De Groote patent can be reacted with diethyl phthalate, or the like, to produce more complicated types of materials or chemical compounds which may be used as demulsifiers for water-in-oil emulsions. The following illustrate added examples:

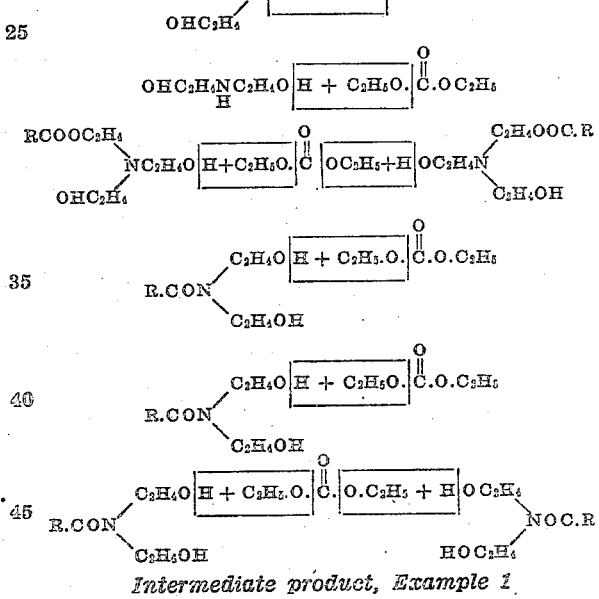

*Intermediate product, Example 1*

Two pound moles of triethanolamine were heated for approximately 6–12 hours under a reflux condenser with one pound mole of diethyl carbonate. The refluxing temperature was approximately 120° C. At the end of the reaction period the mixture was subjected to distillation so as to remove the ethyl alcohol formed and any unreacted diethyl carbonate.

*Intermediate product, Example 2*

The same procedure was followed as in Intermediate product, Example 1, preceding, except that one pound mole of triethanolamine was employed for three pound moles of diethyl carbonate.

*Intermediate product, Example 3*

The product obtained in Intermediate product, Example 2, preceding, was heated further until the resultant mass represented a viscous material almost approaching a rubber-like consistency.

*Intermediate product, Example 4*

Triethanolamine, which had been treated with ethylene oxide in the ratio of three moles of ethylene oxide for one mole of triethanolamine, was substituted as the tertiary amine in the preceding examples.

*Intermediate product, Example 5*

Triisopropanolamine was substituted for triethanolamine in the preceding examples.

*Intermediate product, Example 6*

Two pound moles of diethanolamine were reacted with one pound mole of diethyl carbonate in the same manner as described in Intermediate product, Example 1, preceding. Analysis indicated that the final product contained approximately 50% of a urethane or substituted urea and 50% of an amino ester.

*Intermediate product, Example 7*

Two pound moles of hydroxyethyl ethylene diamine were reacted with one pound mole of diethyl carbonate in the manner described under Intermediate product, Example 1, preceding.

*Intermediate product, Example 8*

The same procedure was followed as in the preceding example, except that tetraethanol tetraethylene pentamine was substituted in place of hydroxyethyl ethylene diamine.

*Intermediate product, Example 9*

One pound mole of hydroxyethyl ethylene diamine was treated with three to five pound moles of ethylene oxide, so as to convert all amino hydrogen atoms to hydroxyethyl radicals. The product so obtained was substituted for hydroxyethyl ethylene diamine in Example 7, preceding.

*Intermediate product, Example 10*

Tris(hydroxymethyl)aminomethane was substituted for triethanolamine in Intermediate product, Example 1, preceding. When this reactant was used, the yield was considerably less than with previous examples, especially those in which triethanolamine was reported. Approximately ½% of sodium bicarbonate was added as a catalyst during the reaction.

In the manufacture of any compound involving diethyl carbonate, it is obvious that care must be taken that the carbonate or some other similar carbonate such as dipropyl carbonate, is not decomposed by the presence of an acidic reagent under conditions which would tend towards liberating carbon dioxide. It is not always possible to predict the stability of the more complex carbonates or derivatives of the kind which have been described and illustrated by the examples of Intermediate products immediately preceding. Indeed, it is not always possible to predict the stability of diethyl carbonate towards aqueous acids, even at normal room temperature. The best test in any instance is an actual laboratory experiment to determine whether or not decomposition and liberation of carbon dioxide takes place. For these reasons, subsequent acylation of intermediate products of the kind previously described is best conducted by a non-acidic fatty acid derivative, rather than the fatty acid derivative itself. In other words, if one attempts to acylate materials of the kind previously described by means of oleic acid, ricinoleic acid, abietic acid, naphthenic acid, or the like, one finds that decomposition takes place, under conditions required to give the desired resultant. One suitable procedure is to resort to a functional equivalent of the acid, such as an ester or amide. This means that for practical purposes it is most convenient to use the higher fatty acids as a source of the high molal monocarboxy detergent-forming radical, for the reason that such acids are available in the form of an ester, i. e., the glyceride. In other instances, and especially when the reaction takes place at a decidedly lower temperature, one may employ a low molal monohydric alcohol ester of the detergent-forming acid, such as a methyl ester, an ethyl ester, or a propyl ester of the fatty acid or detergent-forming acid. In other words, ethyl ricinoleate, ethyl oleate, ethyl naphthenate, ethyl abietate, etc., are particularly desirable reactants. The methyl esters and propyl esters are also desirable. The corresponding amides derived by reaction between one mole of the acids and ammonia may also be used with the subsequent liberation of ammonia during the reaction. What has been said in this connection is readily illustrated by subsequent examples.

Another procedure to obviate such difficulties of decomposition has already been suggested by the formulas or reactions previously presented. One solution resides in introducing the acyl radical of the high molal detergent-forming acid into the desired amino molecule or compound prior to reaction with diethyl carbonate, or its equivalent. For instance, it is well known that any of the monocarboxy detergent-forming acids of the kind herein contemplated as such, or in any equivalent form, including the acyl chloride, amide or acid can be reacted with a variety of primary or secondary amines containing an alkanol radical, such as monoethanolamine, diethanolamine, monopropanolamine, dipropanolamine, tris(hydroxymethyl)-aminomethane, or the like, to produce amides in which there is present at least one amino radical. Other suitable reactants of this type include ethylethanolamine, cyclohexylethanolamine, phenylethanolamine, benzylethanolamine, and the like. The manufacture of such amides is well known and requires no further elaboration, although some subsequent examples may illustrate the formation of such amides by the oxyalkylation of an amide.

In regard to the acylated aminoalcohols used as reactants, one type, a monoamino type, is described in U. S. Patent No. 2,225,824, dated December 24, 1940, to De Groote and Wirtel. Said patent describes in detail the manufacture of compounds of the following formula:

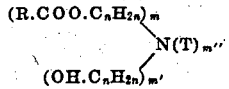

in which R.COO represents the oxyacyl radical derived from a monobasic detergent-forming acid; T represents a hydrogen atom or a non-hydroxy hydrocarbon radical or the acylated radical obtained by replacing a hydrogen atom of the hydroxyl group of an alkylol radical by the acyl radical of a monobasic carboxy acid having less than 8 carbon atoms; $n$ represents a small whole number which is less than 10; $m$ represents the numeral 1, 2 or 3; $m'$ represents the numeral 0, 1 or 2; and $m''$ represents the numeral 0, 1 or 2, with the proviso that $m + m' + m''$ equals 3.

A similar type of compound, which contains an ether linkage, is described in U. S. Patent No. 2,259,704, dated October 21, 1941, to Monson and Anderson. In said patent there is a description of acylated aminoethers containing:

(a) A radical derived from a basic hydroxyaminoether, and said radical being of the kind containing at least one amino nitrogen free from attached aryl and amido-linked acyl radicals; said hydroxyaminoether radical being further characterized by the presence of at least one radical derived from a basic hydroxyamine and being attached by at least one ether linkage to at least one radical selected from the class consisting of glycerol radicals, polyglycerol radicals, polyglycol radicals, basic hydroxyamine radicals, amido hydroxyamine radicals, and aryl alkanolamine radicals; said basic hydroxyaminoether radical being characterized by containing not over 60 carbon atoms; and (b) An acyl radical derived from a detergent-forming monocarboxy acid having at least 8 carbon atoms and not more than 32 carbon atoms; said acylated aminoether being additionally characterized by the fact that said aforementioned acyl radical is a substituent for a hydrogen atom of an alcoholic hydroxy radical.

Although primarily, raw materials, such as triethanolamine, ethyldiethanolamine, and the like, are most frequently employed in the manufacture of the acylated aminoalcohol, it is understood that such materials may be reacted with an oxyethylating agent, such as ethylene oxide, propylene oxide, or the like, to produce comparable materials which also are well known compounds. (See also U. S. Patents Nos. 2,228,986, 7, 8, and 9, all dated January 4, 1941, to De Groote, Keiser, and Blair.) If desired, the acylated aminoalcohols of the kind previously described may be subjected to a subsequent oxyalkylation step, i. e., treatment with ethylene oxide or the like. For example, the ester derived from ricinoleic acid and triethanolamine could be subjected to treatment with ethylene oxide, propylene oxide, or the like. As has been previously pointed out, such acylated aminoalcohols containing at least one basic amino nitrogen atom, need not be obtained from monoamines, or monoaminoalcohols, but may, in fact, be obtained from polyaminoalcohols. Thus, hydroxyethyl ethylenediamine may be treated with three moles of ethylene oxide, so as to obtain tetra-(hydroxyethyl)ethylenediamine. Such product can be readily acylated with a high molal detergent-forming acid. Similarly, diethylenetriamine can be treated with four moles of ethylene oxide, so as to yield a tetra-substituted product. The compound obtained can be acylated with two moles of a suitably selected detergent-forming acid, for example, a higher fatty acid, to give a suitable acylated aminoalcohol having at least two basic nitrogen atoms. Furthermore, in the broadest aspect, one is not limited to acylated derivatives in which the acyloxy radical of the detergent-forming acid enters into the aminoalcohol, but one may employ compounds in which the acyl group, as distinguished from the acyloxy group, is introduced into the amino reactant. For example, ethylenediamine, or diethylenetriamine, may be treated with a detergent-forming monocarboxy acid, so as to yield the acylated polyamine. Such polyamine can then be treated with ethylene oxide or the like, so as to convert it into an aminoalcohol. Insofar that there are two or more amino nitrogen atoms present, obviously, there must be at least one basic nitrogen atom, provided that only partial amidification has been employed.

As to the hydroxylated high molal amides, one is concerned with the type of material which may be obtained as the oxyalkylation derivative of the corresponding amide or substituted amide. For instance, any high molal acid or its equivalent may be reacted with ammonia or the like to produce an amide by conventional procedure. However, amides, instead of being obtained from ammonia, may be obtained from primary amines, such as amines in which a hydrogen atom linked to a nitrogen atom has been replaced by an alkyl radical, an aralkyl radical, an alicyclic radical, an alkylol radical, or the type of radical in which the carbon chain has been interrupted at least once by an oxygen atom. Examples of such amines are amylamine, cyclohexylamine, benzylamine, monoethanolamine, tris(hydroxymethyl)aminomethane, etc. Polyamino types may also be employed, such as ethylenediamine, bis(hydroxyethyl)ethylenediamine, etc. If one starts with ammonia, or an amine free from a hydroxylated radical, it is obvious that the amides so obtained, for instance, oleoamide, ricinoleoamide, amyloleoamide, amylricinoleoamide, or the like, can be treated with one or more moles of an oxyethylating agent, such as ethyleneoxide, propyleneoxide, butyleneoxide, glycid, or the like, to give a high molal substituted amide having at least one monocarboxy detergent-forming acid acyl radical and at least one hydroxylated hydrocarbon group, or the equivalent, wherein the carbon atom chain is interrupted at least once by oxygen. The amine need not be basic, and thus aniline, phenylethanolamine, or the like, may also be employed as a primary reactant. Obviously, however, amides can be obtained as conveniently from a fatty acid, for example, and monoethanolamine, as would be possible by first reacting the fatty acid or its equivalent, such as the ester, with ammonia, and then subjecting the unsubstituted amide to oxyethylation. The production of such amides, and, as a matter of fact, polyamides derived from suitable polyamines, is well known and requires no further elaboration. The presence of a basic nitrogen atom, i. e., a nitrogen atom not directly linked to either an aryl group, or an acyl radical, is not objectionable, and may be desirable. For instance, one might react hydroxyethyl ethylene diamine with ricinoleic acid, so as to introduce the acyl radical, as distinguished from the acyloxy radical. It is to be noted that some of the high molal substituted amides are polyfunctional, in that two or more hydroxy hydrocarbon radicals, or their equivalents, are introduced. Furthermore, there is no objection to using the oxyethylating agent in substantial multiple proportions, i. e., there is no objection to introducing an ether linkage which recurs a number of times. Although reactants of the kind described immediately preceding are well known, a few examples will be given:

*Basic acylated aminoalcohols, Example 1*

Ricinoleic acid is reacted with triethanolamine in the conventional manner to give a compound of the following formula:

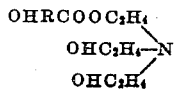

Basic acylated aminoalcohols, Example 2

The same procedure is followed as in the preceding example, except that the triethanolamine is treated with three moles of ethylene oxide prior to acylation with ricinoleic acid.

Basic acylated aminoalcohols, Example 3

Ethyldiethanolamine is substituted for triethanolamine in Examples 1 and 2, preceding.

Basic acylated aminoalcohols, Example 4

Triisopropanolamine or propyldiisopropanolamine is employed, following the same procedure as described in Examples 1 to 3, preceding.

Basic acylated aminoalcohols, Example 5

Hydroxyethyl ethylenediamine is reacted with three moles of ethylene oxide and then with one mole of ricinoleic acid, so as to give a compound of the following composition:

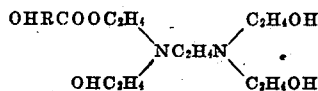

Basic acylated aminoalcohols, Example 6

Diethylenetriamine is treated with four moles of ethylene oxide and then with two moles of ricinoleic acid.

The compounds described in the preceding examples are well known compositions and the method of preparation is well known.

Hydroxylated substituted high molal amides, Example 1

One pound mole of ricinoleic acid is reacted with one pound mole of monoethanolamine to give the corresponding amide.

Hydroxylated substituted high molal amides, Example 2

One pound mole of ricinoleic acid is reacted with one pound mole of diethanolamine to give the corresponding amide.

Hydroxylated substituted high molal amides, Example 3

One pound mole of ricinoleic acid is reacted with one pound mole of 2-amino-2-methyl-1,3-propanediol to give the corresponding amide.

Hydroxylated substituted high molal amides, Example 4

One pound mole of ricinoleic acid is reacted with one pound mole of 2-amino-2-ethyl-1,3-propanediol to give the corresponding amide.

Hydroxylated substituted high molal amides, Example 5

One pound mole of ricinoleic acid is reacted with one pound mole of tris(hydroxymethyl)aminomethane to give the corresponding amide.

Hydroxylated substituted high molal amides, Example 6

One pound mole of ricinoleic acid is reacted with one pound mole of hydroxyethyl ethylenediamine to give the corresponding amide.

Hydroxylated substituted high molal amides, Example 7

One pound mole of diethylenetriamine is reacted with one pound mole of ricinoleic acid to give the corresponding amide, which is then reacted with one pound mole of ethylene oxide to give the corresponding hydroxyethylamide.

Returning now to consideration of acylated products by reaction involving reactants exemplified by Intermediate Examples 1 to 10, inclusive, one need only consider a few specific examples, such as the following, which illustrate procedure so that more elaborate description is unnecessary:

Acylated product, Example 1

Three pound moles of a material of the kind described under Intermediate product, Example 1, preceding, was heated for approximately 2 hours at 200° C. with one pound mole of triricinolein.

Acylated product, Example 2

The same procedure was followed as in Acylated product, Example 1, preceding, but instead of using Intermediate product, Example 1, preceding, there was substituted various other intermediate products, as described under the heading "Intermediate product, Example 2" to "Intermediate product, Example 10," inclusive.

Acylated product, Example 3

In view of the composition of some of the products described under "Intermediate products, Examples 2–10," preceding, it is obvious that more than one acyl radical could be introduced. For instance, three pound moles of an intermediate product of the kind exemplified by Intermediate product, Example 1, was reacted with two pound moles of triricinolein, so as to yield a polyacylated product.

Acylated product, Example 4

Two pound moles of ethanol ricinoleoamide obtained by reaction between ricinoleic acid and ethanolamine, were heated with one pound mole of diethyl carbonate. (See "Hydroxylated substituted high molal amide, Example 1.") The reaction was conducted in the presence of ½% sodium carbonate as a catalyst. The material was refluxed at approximately 120° C. for eight hours and then the distillate removed in the customary manner.

Acylated product, Example 5

Diethyl ricinoleoamide derived by reaction between ricinoleic acid and diethanolamine was substituted for ethanol ricinoleoamide in the preceding example. (See Hydroxylated substituted high molal amide, Example 2.) Approximately one-half percent of sodium bicarbonate was added as a catalyst during the reaction.

Acylated product, Example 6

The amide derived by reaction between ricinoleic acid and tris(hydroxymethyl)aminomethane was substituted for diethanol ricinoleoamide in the preceding example. (See Hydroxylated substituted high molal amide, Example 5.) Approximately one-half percent of sodium bicarbonate was added as a catalyst during the reaction.

As to the preparation of the desired new compositions of matter or demulsifying agents by reactions involving diethyl carbonate, or its equivalent, and an acylated amino alcohol, reference is made to the following examples:

Acylated product, Example 7

Two pound moles of a type of material exemplified by Basic acylated amino alcohols, Example 1, is reacted with one pound mole of diethyl carbonate. The reaction is conducted in the presence of one-half of 1% of sodium bicarbonate as a catalyst. The material is refluxed at approximately 120° C. for 8 hours and the distillate then removed in the customary manner.

*Acylated product, Example 8*

Two pound moles of materials exemplified by Basic acylated amino alcohols, Example 2, are reacted with one pound mole of diethyl carbonate in the same manner as preceding Example 7.

*Acylated product, Example 9*

Two pound moles of material of the kind exemplified by Basic acylated amino alcohols, Examples 3 to 6, inclusive, are reacted with one pound mole of diethyl carbonate in the same manner as in Example 7, immediately preceding.

As has been previously pointed out, any of the high molal monocarboxy detergent-forming acid compounds may be employed to introduce the acyl group indicated by the radical RCO. It is our preference, however, to use fatty acid compounds as the source of such high molal acyl radical. Such acid compounds are commonly referred to as higher fatty acid compounds. We prefer to use fatty acid compounds derived from acids having 18 carbon atoms, and more especially, unsaturated fatty acid compounds. We particularly prefer to use compounds obtained from oleic acid, ricinoleic acid, linoleic acid, linolenic acid, etc. We have found that the mixture of fatty acids obtained from soyabean oil, peanut oil, teaseed oil, linseed oil, corn oil, cottonseed oil, and the like, would be particularly desirable, after conversion into suitable compounds.

Attention is again directed to the fact that instead of using reactants of the kind described, one may use reactants in which alkyl radicals, aralkyl radicals, or alicyclic radicals may be present. It has been previously pointed out that such reactants are readily available by the oxyalkylation, particularly the oxyethylation, of naphthylamine, aniline, cyclohexylamine, ethyl cyclohexylamine, dicyclohexylamine, benzylamine, ethyl benzylamine, etc.

Conventional demulsifying agents employed in the treatment of oil field emulsions are used as such, or after dilution with any suitable solvent, such as water; petroleum hydrocarbons, such as gasoline, kerosene, stove oil; a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc. may be employed as diluents. Similarly, the material or materials employed as the demulsifying agent of our process may be admixed with one or more of the solvents customarily used in connection with conventional demulsifying agents. Moreover, said material or materials may be used alone, or in admixture with other suitable well known classes of demulsifying agents.

It is well known that conventional demulsifying agents may be used in a water-soluble form, or in an oil-soluble form, or in a form exhibiting both oil and water solubility. Sometimes they may be used in a form which exhibits relatively limited oil solubility. However, since such reagents are sometimes used in a ratio of 1 to 10,000, or 1 to 20,000, or even 1 to 30,000, such an apparent insolubility in oil and water is not significant, because said reagents undoubtedly have solubility within the concentration employed. This same fact is true in regard to the material or materials employed as the demulsifying agent of our process.

We desire to point out that the superiority of the reagent or demulsifying agent contemplated in our process is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned, but we have found that such a demulsifying agent has commercial value, as it will economically break or resolve oil field emulsions in a number of cases which cannot be treated as easily or at so low a cost with the demulsifying agents heretofore available.

In practising our process for resolving petroleum emulsions of the water-in-oil type, a treating agent or demulsifying agent of the kind above described is brought into contact with or caused to act upon the emulsion to be treated, in any of the various ways, or by any of the various apparatus now generally used to resolve or break petroleum emulsions with a chemical reagent, the above procedure being used either alone, or in combination with other demulsifying procedure, such as the electrical dehydration process.

The demulsifier herein contemplated may be employed in connection with what is commonly known as down-the-hole procedure, i. e., bringing the demulsifier in contact with the fluids of the well at the bottom of the well, or at some point prior to the emergence of said well fluids. This particular type of application is decidedly feasible when the demulsifier is used in connection with acidification of calcareous oil-bearing strata, especially if suspended in or dissolved in the acid employed for acidification.

Attention is directed to the fact that the compounds herein described, i. e., the finished products, may be considered as intermediates for subsequent and further reaction. For instance, they may be combined with dibasic or polybasic acid esters, such as the dialkyl esters of phthalic acid, maleic acid, citraconic acid, and the like, to produce resinous and sub-resinous materials. They may be combined with chloracetic acid esters, such as ethyl chloroacetate, so as to give derivatives which can be united with tertiary amines to form quaternary compounds. They may be subjected to further oxyethylation, so as to produce additional types of wetting agents. All such various derivatives are effective demulsifiers for crude oil emulsions of the water-in-oil type. Furthermore, the introduction of a low molal acyl radical, for instance, the introduction of an acetic acid radical, lactic acid radical, or a hydroxyacetic acid radical, is not objectionable, and in many instances, gives a particularly desirable product, not only for the present purpose, but also if employed as an intermediate for more complicated reactions of the kind enumerated in the paragraph immediately preceding. Such low molal acid radicals are best introduced by use of the esters, such as ethyl acetate, as a reactant.

Having thus described our invention, what we claim as new and desire to secure by Letters Patent is:

1. A process for breaking petroleum emulsions of the water-in-oil type, which consists in subjecting the emulsion to the action of a demulsifier comprising a monocarboxy acid ester; in said ester, the acyl radical RCO of the monocarboxy acid RCOOH is that of a detergent-forming acid having at least 8 and not more than 32 carbon atoms and is the substituent for at least one alcoholic hydroxyl hydrogen atom of an alcohol; which alcohol is in turn a hydroxylated amino ester of the formula:

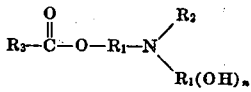

in which $R_1$ is a member of the class consisting of alkylene and oxyalkylene radicals having not more than 4 carbon atoms in the alkylene group; $R_2$ is a member of the class consisting of hydrogen atoms, $R_1(OH)n$ radicals, and monovalent hydrocarbon radicals having not over 7 carbon atoms; $R_3$ is a member of the class consisting of:

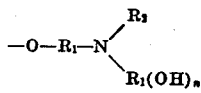

radicals, $OR_4$ radicals, where $R_4$ is an alkyl radical having not more than 4 carbon atoms and

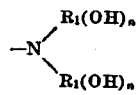

radicals; and in all instances $n$ being a small whole number.

2. The process of claim 1, wherein RCO is the acyl radical of an unsaturated higher fatty acid, and $R_2$ is an $R_1(OH)n$ radical, and $R_3$ is an

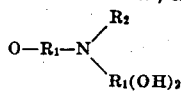

radical, all occurrences of $R_1$ being ethylene radicals, and $n$ being one.

3. The process of claim 1, wherein RCO is a ricinoleyl radical, and $R_2$ is an $R_1(OH)n$ radical, and $R_3$ is an

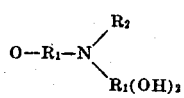

radical, all occurences of $R_1$ being ethylene radicals, and $n$ being one.

4. The process of claim 1, wherein RCO is an oleyl radical, and $R_2$ is an $R_1(OH)n$ radical, and $R_3$ is an

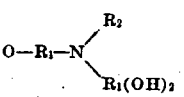

radical, all occurrences of $R_1$ being ethylene radicals, and $n$ being one.

5. The process of claim 1, wherein RCO is a linoleyl radical, and $R_2$ is an $R_1(OH)n$ radical, and $R_3$ is an

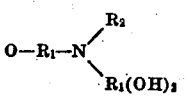

radical, all occurrences of $R_1$ being ethylene radicals, and $n$ being one.

MELVIN DE GROOTE.
BERNHARD KEISER.